United States Patent
Kroke et al.

(10) Patent No.: US 7,795,368 B2
(45) Date of Patent: Sep. 14, 2010

(54) SILICON- AND POLYSILYL CYAMELURATES AS WELL AS -CYANURATES, METHODS FOR THE PRODUCTION THEREOF AND THEIR USE

(75) Inventors: Edwin Rolf Balduin Kroke, Freiberg (DE); Marcus Rolf Schwarz, Freiberg (DE); Nadia Emam Aly El Gamel, Freiberg (DE)

(73) Assignee: Zylum Beteiligungsgesellschaft mbH & Co. (DE)

( * ) Notice: Subject to any disclaimer, the term of this patent is extended or adjusted under 35 U.S.C. 154(b) by 181 days.

(21) Appl. No.: 11/922,036

(22) PCT Filed: Aug. 6, 2006

(86) PCT No.: PCT/EP2006/005501

§ 371 (c)(1),
(2), (4) Date: Mar. 31, 2008

(87) PCT Pub. No.: WO2006/133849

PCT Pub. Date: Dec. 21, 2006

(65) Prior Publication Data
US 2008/0262185 A1    Oct. 23, 2008

(30) Foreign Application Priority Data
Jun. 13, 2005 (DE) .................. 10 2005 027 399

(51) Int. Cl.
*C08G 77/26* (2006.01)
(52) U.S. Cl. ............................. 528/34; 528/39; 528/40
(58) Field of Classification Search ....................... None
See application file for complete search history.

(56) References Cited

U.S. PATENT DOCUMENTS 6,018,044 A    1/2000   Huber
6,531,539 B2   3/2003   Krafczyk et al.

FOREIGN PATENT DOCUMENTS

EP    0654497 A1    5/1995

OTHER PUBLICATIONS

Gordetsov, A.S., et al., "Synthesis of organotin derivatives of melam, melem, and cyamelluric acid," Database CA [Online] Chemical Abstracts Service, Database Accession No. 97:39048, 1980, 1 page.
Dergunov, Y.I., et al., "Silylation and stannylation of cyameluric acid," Database CA [Online] Chemical Abstracts Service, Database Accession No. 85:143228, 1976, 1 page.

*Primary Examiner*—Marc S Zimmer
(74) *Attorney, Agent, or Firm*—McDonnell Boehnen Hulbert & Berghoff LLP

(57) ABSTRACT

The invention relates to a novel family of oligomeric and polymeric s-triazine and s-heptazine derivatives and to their use as an intermediate, e.g. as precursors for producing Si/(M)/C/N/(O) ceramics, as mesoporous materials such as, e.g., catalyst carriers for storing gas or as a stationary phase for chromatography, as flameproofing agents, plastic additives or for other organic/inorganic functional materials.

9 Claims, 2 Drawing Sheets

A: R = O-, R' = alkyl, aryl, etc.   B:   1 = s-Heptazine group or R/R' = alkyl, aryl, etc.              2 = s-Triazine group

SILICON- AND POLYSILYL CYAMELURATES AS WELL AS -CYANURATES, METHODS FOR THE PRODUCTION THEREOF AND THEIR USE

FIELD OF THE INVENTION

The present invention relates to a new compound class of oligomeric and polymeric s-triazine and s-heptazine derivatives and to their use as intermediates, for example, as precursor compounds (precursors) for the manufacture of Si/(M)/C/N/(O) ceramics, as mesoporous materials, such as, for example, catalyst carriers, for storing gas, or as a stationary phase for chromatography, as flame proofing agents, plastic additives or for other organic/inorganic functional materials.

BACKGROUND

In the Russian publication A. S. Gordetsov, Yu. I. Dergunov, N. K. Gavrilova, "Synthesis of organotin derivatives of melam, melem, and cyamelluric acid," Khimiya Elementoorgan. Soedin. (Gor'kii), 8 (1980), 59-61 (CAN 97:39048), the synthesis of tris(trimethylsilyl)melem $C_6N_7(NHSiMe_3)_3$ from melem and di(n-butyl)-trimethylsilylamine is described. In Yu. I. Dergunov, A. S. Gordetsov, I. A. Vostokov, E. N. Boitsov, "Silylation and stannylation of cyameluric acid," Zhurnal Obshchei Khimii, 46 (1976), 1653-4, the synthesis of the tris(trimethylsilyl)cyameluric acid ester $C_6N_7(OSiMe_3)_3$ is described.

In numerous patents, the use of heptazine derivatives as components for fire resistant or low-flammability synthetic formulations is claimed. s-Triazine derivatives have been examined substantially better than the mentioned s-heptazine derivatives. Examples of application fields are in the electronic, plastic, wood and textile industries. The s-triazine ring, moreover, is found in different pharmacologically active substances. From the literature, the following, three silicon-containing, compounds are known: molecular silyl esters of cyanuric acid $(C_3N_3(OH)_3)$: $(C_3N_3(OSiMe_2(SiMe_3))_3)$, $(C_3N_3(OSiMe_2H)_3)$ and $(C_3N_3(OSiMe_3)_3)$.

To date, there are no known one-, two- and three-dimensionally extended covalent oligomers or polymers and frameworks based on $C_6N_7$—O—Si or $C_3N_3$—O—Si structural units.

Thus, the problem of the present invention is to make such systems available for the first time.

This problem is solved by the embodiments characterized in the claims.

SUMMARY OF THE INVENTION

In particular, the present invention makes available oligomers or polymers that comprise at least one structural unit which is chosen from the group consisting of silicon cyanurates, $[Si_3(C_3N_3O_3)_4]_n$; silicon cyamelurates, $[Si_3(C_6N_7O_3)_4]_n$; silyl cyanurates, $[Si(R^aR^b)_{1.5}(C_3N_3O_3)]_n$; silyl cyamelurates, $[Si(R^aR^b)_{1.5}(C_6N_7O_3)]_n$; silsesquicyanurates, $[Si(R^a)(C_3N_3O_3)]_n$; and silsequicyamelurates, $[Si(R^a)(C_6N_7O_3)]_n$; where n stands for a whole number between 1 and ∞, preferably 1 to 50,000, and $R^a$ and $R^b$ are chosen, independently of each other, from the group α, which consists of hydrogen, halogen, hydroxy, straight-chained or branched-chained ($C_1$-$C_{18}$) alkyl residue, ($C_3$-$C_7$) cycloalkyl residue, a straight-chained or branched-chained ($C_2$-$C_{18}$) alkenyl residue, a straight-chained or branched-chained ($C_2$-$C_{18}$) alkinyl residue, a straight-chained or branched-chained ($C_1$-$C_6$) alkoxy residue, furyl, furanyl, benzofuranyl, thienyl, thiazolyl, benzothiazolyl, thiadiazolyl, imidazolyl, pyrazolyl, triazolyl, tetrazolyl, pyrazinyl, pyrrolidinyl, pyrimidinyl, imidazolinyl, pyrazolidinyl, phenyl, phenoxy, benzyl, benzyloxy, naphthyl, naphthoxy or pyridyl, which can each be substituted with one to five substituents chosen independently of each other from the group β, which consists of a straight-chained or branched-chained ($C_1$-$C_6$) alkyl residue, a ($C_3$-$C_7$) cycloalkyl residue, a straight-chained or branched-chained ($C_1$-$C_6$) alkoxy residue, halogen, hydroxy, amino, di($C_1$-$C_6$) alkylamino, nitro, cyano, benzyl, 4-methoxybenzyl, 4-nitrobenzyl, phenyl and 4-methoxyphenyl.

The structure forming units of the compound class according to the invention or of the frameworks derived therefrom are the s-heptazine fragment (or the cyamelurate group $[C_6N_7O_3]^{3-}$), 1, and/or the analogous s-triazine fragment (or the cyanurate structural unit $[C_3N_3O_3]^{3-}$), 2, which are connected by a bridge, or expanded, via silicon-containing groups, preferably $SiO_xR_{4-x}$ tetrahedral (with x=2, 3 or 4; R and R', respectively, are defined as $R^a$ and $R^b$ above, chosen particularly from a straight-chained or branched-chained ($C_1$-$C_6$) alkyl residue, a ($C_3$-$C_7$) cycloalkyl residue, a straight-chained or branched-chained ($C_2$-$C_6$) alkenyl residue, an unsubstituted or substituted $C_6$-$C_{10}$ aryl residue) (see FIG. 1).

Examples of the compound class according to the invention are, with the assumption of an idealized polymer stoichiometry:

silicon cyamelurate and cyanurate: $Si_3(C_6N_7O_3)_3$ I and $Si_3(C_3N_3O_3)_4$ II, respectively, the silsesqui compounds: $[RSi(C_6N_7O_3)]_n$ III and $[RSi(C_3N_3O_3)]_n$ IV $[(R^aR^bSi)_3(C_6N_7O_3)_2]_n$ V and $[(R^aR^bSi)_3(C_3N_3O_3)_2]$ VI, and any combinations of I to VI.

In an embodiment of the present invention, an oligomer or polymer is produced, which is a silicon-centered dendritic compound of the first generation or of a higher generation derived therefrom, corresponding to $Si[\Delta R^a_2]_4$, $R^a$—$Si[\Delta R^b_2]_3$ or $R^aR^bSi[\Delta R^c_2]_2$, with $\Delta$=($C_3N_3O_3$) cyanurate or ($C_6N_7O_3$) cyanurate, where $R^a$ and $R^b$ are defined as above, and $R^c$ is defined as $R^a$ and $R^b$, respectively.

In an additional embodiment of the present invention, an oligomer or polymer is produced, which is a cyanurate- or cyamelurate-centered dendritic compound of the first generation, or of a higher generation derived therefrom, corresponding to $[\Delta(SiR^aR^bR^c)_3]$, $[R^a(C_3N_3O_3)(SiR^bR^cR^d)_2]$ or $[R^a(C_6N_7O_3)(SiR^bR^cR^d)_2]$, with $\Delta$=$C_3N_3O_3$ cyanurate or $N_6N_7O_3$ cyanurate, where $R^a$, $R^b$, $R^c$ and $R^d$ are defined, independently of each other, as $R^a$ and $R^b$ above.

In the context of the present invention, dendrimers denote high-order, oligomeric to polymeric compounds with defined branching. They possess an initiator core, which is either cyanurate- or cyamelurate-centered, or correspondingly silicon-centered—from which the branching units originate and extend in all the directions of space. Around the initiator core of the core functionality, the branching units form corresponding spheres, which are called generations.

In yet another embodiment of the present invention, an oligomer or polymer is produced, which is a derivatized silyl cyanurate, $([Si(R^aR^b)—R^d—Si(R^eR^f)]_{1.5}[C_3N_3O_3])_n$, or a derivatized silyl cyamelurate, $([Si(R^aR^b)—R^d—Si(R^eR^f)]_{1.5}[C_6N_7O_3])_n$, where n, $R^a$ and $R^b$ are defined as above, $R^e$ and $R^f$ are defined, independently of each other, as $R^a$ and $R^b$ above, and where $R^d$ stands for a $SiR^aR^b$ group, a chalcogen atom, particularly an oxygen atom, a ($C_1$-$C_6$) alkylene group, particularly methylene, a ($C_6$-$C_{10}$) arylene group, particularly phenylene, or an $R^9X$ bridge (X=element of the third or fifth main group, and $R^9$ is chosen from hydrogen, halogen, hydroxy, a straight-chained or branched-chained ($C_1$-$C_{18}$) alkyl residue, a ($C_3$-$C_7$) cycloalkyl residue, a straight-chained or branched-chained ($C_2$-$C_{18}$) alkenyl residue, a straight-chained or branched-chained ($C_2$-$C_{18}$) alkinyl residue, or a straight-chained or branched-chained ($C_1$-$C_6$) alkoxy residue.

The oligomers or polymers according to the invention can be particularly in the form of a colloidal suspension (sols, gels) in appropriate solvents, preferably, tetrahydrofuran, dioxane, dialkyl ethers, petroleum ethers, hexane fraction, benzene, toluene and mesitylene.

Another object of the present invention relates to a method for the manufacture of the oligomers or polymers according to the invention, which comprises the step of the reaction of cyanuric acid and/or cyameluric acid with tetraalkyl orthosilicate or with a corresponding alkoxysilane with one, two or three substitutions.

Alternatively, the oligomers or polymers according to the invention can be manufactured by a method which comprises the step of the reaction of a tris(trialkylsilyl) cyanurate and/or tris(trialkylsilyl)cyamelurate with silicon tetrachloride or with a corresponding chlorosilane with one, two or three substitutions.

The above processes can be followed optionally by a subsequent polymerization or crosslinking by hydrolysis or ammonolysis of the corresponding halogen or alkoxy terminal group-containing derivatives.

Another object of the present invention is the use of the oligomers or polymers according to the invention as a stationary phase for chromatography, as a microporous filter material, as a storage medium for liquids and gases, as a catalyst and/or catalyst carrier for heterogeneous catalysis, as a flame proofing agent, particularly for plastics, textiles, wood products, paper, paperboards, plasters, insulation materials and composite building materials, for the manufacture of polymer foams, or for the manufacture of materials and components whose optical, acoustic, magnetic or (opto)electronic properties are used.

Furthermore, the oligomers or polymers according to the invention can be used, in the context of sol-gel procedures for manufacturing coatings, molded bodies and powders, aerogel and xerogels, particularly if the oligomers or polymers according to the invention are in the form of a colloidal suspension (sols, gels), as described above.

DETAILED DESCRIPTION OF THE INVENTION

Figure 1:
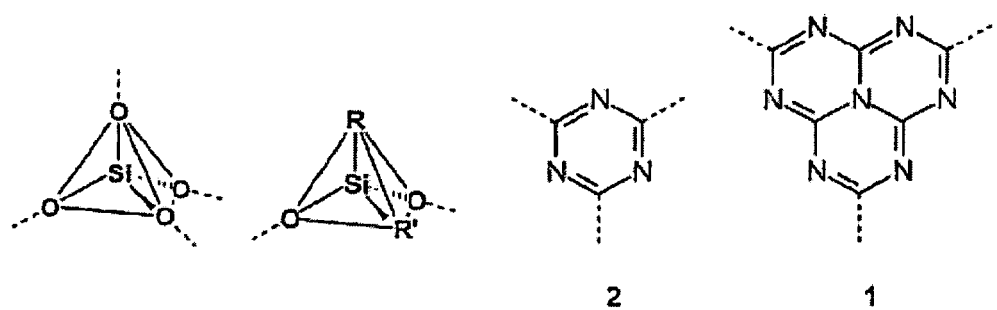
FIG. 1 describes the construction of the oligomers or polymers according to the invention by combining the components A ($SiO_xR_{4-x}$ tetrahedra) and B (s-heptazine group or s-triazine group).
Figure 2:
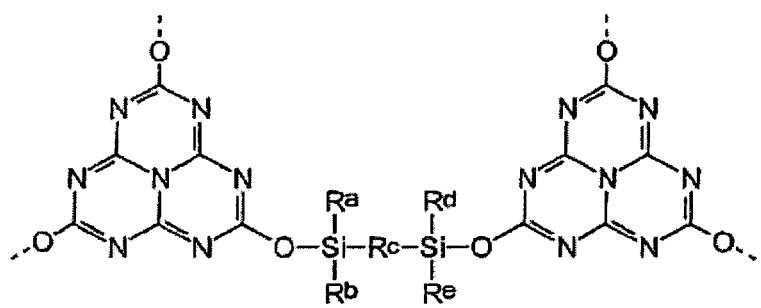
FIG. 2 illustrates the modification of the polymers according to the invention by the use of different functionalized chlorosilanes.
Figure 3:
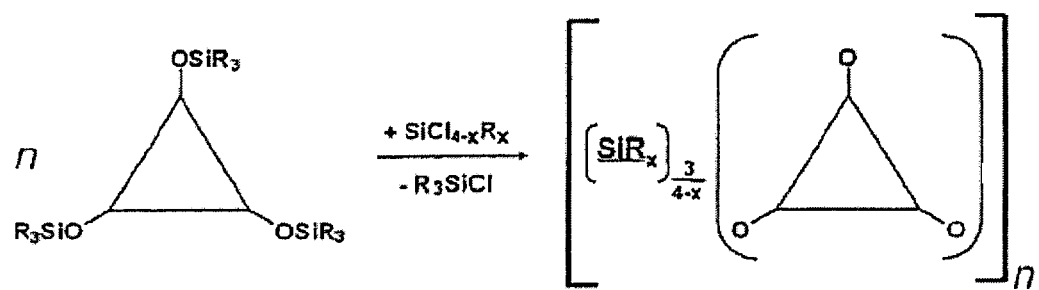
FIG. 3 describes the general (idealized) reaction, which is the basis of Examples 1-7, where $\Delta = C_3N_3, C_6N_7$ and $R = CH_3$ and x=0, 1, or 2.
Figure 3:

The principle of the constitution of the oligomers or polymers according to the invention is apparent from FIG. 1. Using the method according to the invention, it is also possible to produce polymers from complicated chlorosilanes, for example, $\alpha,\omega$-dichlorosilanes, or bridged chlorosilanes of the type $ClR^aR^bSi$—$R^c$—$SiR^dR^eCl$, where $R^a$ and $R^b$ are defined as above, and $R^d$ and $R^e$ are defined as $R^a$ and $R^b$, while $R^c$ is chosen from a straight-chained or branched-chained ($C_2$-$C_{18}$) alkenyl residue, a straight-chained or branched-chained ($C_2$-$C_{18}$) alkinyl residue, or an unsubstituted or substituted ($C_6$-$C_{10}$) arylene residue, where one substituent, or several substitutents, is or are chosen from the group $\beta$ (see FIG. 2).

Depending on the manufacturing method, the polymers can contain significant quantities of terminal groups (for example, chloro- and trimethylsiloxy groups), without significantly influencing the fundamental structure, or the properties of the polymers according to the invention. The chemical structure and the morphology of the polymers according to the invention depend on the synthesis conditions used. Under appropriately chosen conditions, gels form, which can be converted into xerogels or aerogels. The latter are characterized by a very high specific surface area, and by pores in the micro range (<2 nm) and/or meso range (2-50 nm).

Highly porous framework structures, in which the transition metal-oxygen polyhedra are linked by multitoothed, usually rigid, aromatic ligands via ionic interactions; so-called "metal organic frameworks" (MOFs) have been studied intensively in the past few years and are also the subject of intense commercial interest. MOFs can be used to store gas, as catalysts in synthetic chemistry, and as sensor materials. Today, industrial pilot installations are already functioning. In some of these applications, the frameworks according to the invention may be superior, due to their high thermal stability, to the MOFs, by withstanding, for example, higher temperatures during the synthesis reactions.

The polymers according to the invention are generally colorless (white) and opaque, and they can be modified by the targeted incorporation of colored components. The polymers tend to undergo hydrolysis, and are therefore suitable for the formation of biodegradable, inorganic-organic materials.

The polymers according to the invention can be synthesized in principle by different pathways. Suitable starting substances, corresponding to the silicon cyanurates or cyamelurates according to the invention, are, for example, the oxygen halides $C_3N_3Cl_3$, $C_3N_3F_3$ or $C_6N_7O_3$, which can be reacted with soluble metal silicates, alkoxysilanes or siloxysilanes. Moreover, the "ortho acids," cyanuric acid $C_3N_3O_3H_3$ and cyameluric acid $C_6N_7O_3H_3$, and their alkylammonium salts can be reacted with alkoxysilanes or chlorosilanes.

Reactions that are particularly advantageous are those in which the poly(s-heptazine siloxanes) or poly(s-triazine siloxanes) are synthesized by exchange reactions from tris (trialkylsilyl)cyameluric acid esters, for example, $(C_6N_7(OSiMe_3)_3)$ or tris(trialkylsilyl)cyanuric acid esters, for example, $(C_3N_3(OSiMe_3)_3)$. Typical results and the associated reaction equations can be found below in the examples.

The products are produced at high yields. Moreover, it is noteworthy that, under appropriate conditions (dilution not excessive, and no stirring) a sol-gel process takes place phenomenologically. In the process, the homogeneous solution solidifies relatively abruptly at the so-called gel point. An aging process then follows, which is usually characterized by continued condensation reactions and syneresis. Depending on the educts, the preparation size, and the pressure and temperature conditions, the reaction time varies considerably. According to the present invention, the oligomers or polymers according to the invention can also be produced in pure (including crystalline) form.

In the context of the present invention, the corresponding compounds can also be present as terminal group-containing oligomers or polymers. In addition, corresponding combinations of the oligomers or polymers according to the invention are included.

The present invention is now described in greater detail in the following, nonlimiting, examples.

EXAMPLES

All the reactions are carried out under a protective gas with the Schlenk and glove box technique. Commercially available (Aldrich) chlorosilanes were used. The trimethylsilyl esters of cyameluric acid and of cyanuric acid were synthesized according to Y. I. Drgunov, I. A. Vostokov, A. S. Gordetsov, V. A. Gal'perin, Silylation and stannylation of cyanuric acid, Zhurnal Obshchei Khimii (1976), 46(7), 1573-6. b) Yu. I. Dergunov, A. S. Gordetsov, I. A. Vostokov, E. N. Boitsov, Silylation and stannylation of cyameluric acid, Zhumal Obshchei Khimimi, 46 (1976), 1653-4.

Example 1

$\Delta = C_3N_3$, x=0, as Sol-gel Reaction

In each of two Schlenk flasks (25 mL) with a magnetic stirring rod, 346 mg (1 mmol) $C_3N_3(OSiMe_3)_3$ were dissolved in 5 mL anhydrous THF. 88 µL (0.77 mmol) $SiCl_4$ were added dropwise to the solution, and the closed vessels were stored without further stirring at room temperature (preparation 1A) or 45° C. (preparation 1B).

After approximately 24 h, the preparation 1B had solidified to a gel. After two more days, a slight shrinkage of the gel bodies, and secretion of the liquid phase (syneresis) were observed.

In the case of the preparation 1A, turbidity of the reaction preparation developed after three days, after six days a stiff gel was obtained, which presented syneresis on the following days.

Example 2

$\Delta = C_3N_3$, x=1, as Sol-gel Reaction

In each of two Schlenk flasks (25 mL) with a magnetic stirring rod, 173 mg (0.5 mmol) $C_3N_3(OSiMe_3)_3$ were dissolved in 4 mL anhydrous THF. 58 µL (0.5 mmol) $CH_3SiCl_3$ were added dropwise to the solution, and the closed vessels were stored without further stirring at room temperature (preparation 2A) or 45° C. (preparation 2B).

In the case of the preparation 2A, turbidity of the reaction preparation developed after three hours; after six days a flowable gel was obtained, which presented increasing syneresis on the following days.

In the case of the preparation 2B, turbidity of the reaction preparation developed after one hour; after one day a stiff gel was obtained, which presented increasing syneresis on the following days.

Example 3

$\Delta = C_3N_3$, x=2, as Sol-gel Reaction

In a Schlenk flask (25 mL) with a magnetic stirring rod, 173 mg (0.5 mmol) $C_3N_3(OSiMe_3)_3$ were dissolved in 4 mL anhydrous THF. 95 µL (0.079 mmol) $(CH_3)_2SiCl_2$ were added to the solution, and the closed vessel was stored without further stirring at room temperature.

After three hours, turbidity of the reaction preparation developed; after six days, the sol had not yet solidified.

Example 4

$\Delta = C_6N_7$, x=0, Manufacture as Powder

In a Schlenk flask (100 mL) with a magnetic stirring rod, 1 g (2.3 mmol) $C_6N_7(OSiMe_3)_3$ were dissolved in anhydrous THF. To the solution, 0.39 mL (3.4 mmol) $SiCl_4$ was added at room temperature, and the reaction mixture was boiled for 55 h at reflux. The whitish suspension was then reduced, and the reaction byproducts and solvent residues were removed at 100° C. in a vacuum. The product was a beige solid. Yield 113% of the theoretical yield; IR (cm$^{-1}$ KBr pellet): 448 (m), 791 (m), 1015 (m); 1099 (s), 1160 (m), 1261 (m), 1460 (vs), 1655 (vs), 2961 (m).

Pyrolysis: 350 mg of the product obtained were stored in a quartz glass tube for 2 h at 55° C. 292 mg of a black solid were recovered (16% weight loss). The X-ray powder diffractogram of this substance showed broad reflexes of a new phase at 2.82; 3.62; 4.13 and 4.96 Å, where the latter is the peak with maximum intensity. The presence of the $C_6N_7$ fragments after the heat treatment was detected from the characteristic bands at 1633, 1448 and 800 cm$^{-1}$ in the IR spectrum. In addition, as in the unpyrolyzed state, a strong Si—O—C band occurred at 1095 cm$^{-1}$.

Example 5

$\Delta = C_6N_7$, x=0, as Sol-gel Reaction

In two Schlenk flasks (25 mL) with a magnetic stirring rod, 525 mg (1.2 mmol) $C_6N_7(OSiMe_3)_3$ were dissolved in 7 mL and 5 mL, respectively, anhydrous THF. To the solution, 102 µL (0.89 mmol) and 350 µL (3 mmol), respectively, $SiCl_4$ were added dropwise. The two preparations were then stored without further stirring at room temperature, or at 45° C.

Already after ≦5 min a stiff gel was obtained in both cases. Syneresis occurred after the preparation had been kept at a certain temperature for 6 h; at room temperature it occurred after approximately one day. The gel bodies underwent shrinkage for several days.

Example 6

$\Delta = C_6N_7$, x=1, as Sol-gel Reaction

In a Schlenk flask (25 mL) with a magnetic stirring rod, 220 mg (0.5 mmol) $C_6N_7(OSiMe_3)_3$ were dissolved in 4 mL anhydrous THF. To the solution, 59 µL (0.5 mmol) $CH_3SiCl_3$ were added dropwise, and the closed vessels were stored at room temperature without further stirring.

A stiff gel was obtained already after 5 min. Syneresis followed after approximately 3 days.

Example 7

$\Delta = C_6N_7$, x=2, Manufacture as Powder

In a Schlenk flask (100 mL) with a magnetic stirring rod, 1 g (2.3 mmol) $C_6N_7(OSiMe_3)_3$ was dissolved in anhydrous THF. To the solution, 0.41 mL (3.4 mmol) $(CH_3)_2SiCl_2$ at room temperature were added, and the reaction mixture was boiled for 30 h at reflux. The whitish suspension was then reduced, and the reaction byproducts and solvent residues were removed at 100° C. in a vacuum, where a light brown solid formed, yield 105% of the theoretical yield.

IR (cm$^{-1}$, KBr pellet): 802 (vs), 1090 (vs); 1261 (vs), 1454 (m), 1653 (vs), 2957 (m).

Elemental Analysis:

| [Weight %]    | C       | H      | N       | Si     | O       | Cl    |
|---------------|---------|--------|---------|--------|---------|-------|
| Measurement 1 | 34.7    | 3.79   | 26.9    | 12.1   | 18.3    | 1.9   |
| Measurement 2 | 34.4    |        | 27.7    |        | 19.2    |       |
| Calculated*   | (35.40) | (2.97) | (32.11) | (13.8) | (15.72) | (0.0) |

*for [(Si(CH$_3$)$_2$)$_{1.5}$(C$_6$N$_7$O$_3$)]$_n$

The X-ray powder diffractogram of this substance showed broad reflexes of a new phase with intensity maxima at 3.16; 3.69; 4.09; 4.98 and 7.49 Å.

Example 8

Δ=C$_6$N$_7$, x=2, as Sol-gel Reaction

In a Schlenk flask (25 mL) with a magnetic stirring rod, 114 mg (0.026 mmol) C$_6$N$_7$(OSiMe$_3$)$_3$ were dissolved in 2 mL anhydrous THF. To the solution, 47 μL (0.39 mmol) (CH$_3$)$_2$SiCl$_2$ were added dropwise, and the closed vessel was stored at room temperature without further stirring.

After one hour, turbidity of the reaction preparation developed; after six days, the sol had not yet solidified.

Example 9

Figure 4:
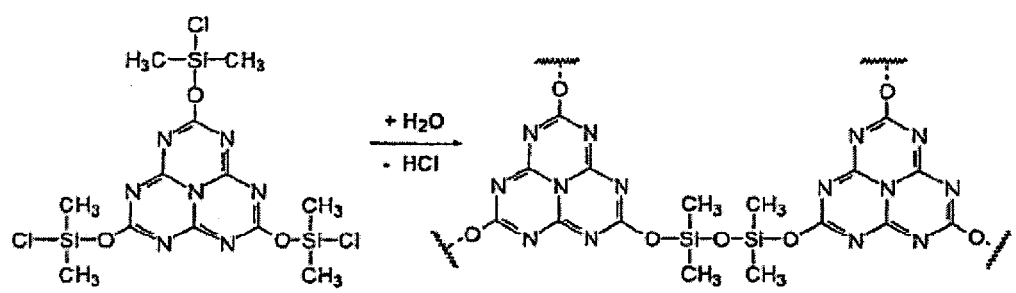
FIG. 4 illustrates the reaction described in Example 9.

Preparation of a Layer of tris(chlorodimethylsilyl) cyamelurate from {(ClSi(CH$_3$)$_2$)$_x$(Si(CH$_3$)$_2$O)$_{1.5-(x/2)}$(C$_6$N$_7$)}$_n$ by Hydrolytic Coupling of (C$_6$N$_7$O$_3$)(Si(CH$_3$)$_2$Cl)$_3$ The reaction equation is described in FIG. 4.

In a Schlenk flask (50 mL) with a magnetic stirring rod, 12 mL (99 mmol) (CH$_3$)$_2$SiCl$_2$ were added to 1 g (2.3 mmol) C$_6$N$_7$(OSiMe$_3$)$_3$ at room temperature; then, the reaction mixture was boiled for 10 h at reflux. Then, the excess chlorosilane and (CH$_3$)$_3$SiCl were removed at 100° C. in a vacuum. In the process, a white solid is obtained, yield 68.4% of the theoretical yield. Melting point: 206° C.; decomposition occurs at 330° C.

In a protective gas box with <0.1 ppm H$_2$O, a small quantity of the product obtained was finely ground in THF. The suspension so obtained was applied to a monocrystalline KBr plate. This plate was removed, and the hydrolytic polymerization, which occurs in contact with the humid environmental air, and is sketched in the above scheme, is observed by FT-IR spectroscopy. In the process, the Si—O—Si oscillation band at approximately 1080 cm$^{-1}$ increased in intensity within 40 min.

Example 11

Δ=C$_6$N$_7$, x=2, as Sol-gel Reaction

In a Schlenk flask (25 mL) with a magnetic stirring rod, 114 mg (0.026 mmol) C$_6$N$_7$(OSiMe$_3$)$_3$ were dissolved in 2 mL anhydrous THF. To the solution, 47 μL (0.39 mmol) (CH$_3$)$_2$SiCl$_2$ were added dropwise, and the closed vessel was stored at room temperature without further stirring. After one hour, turbidity of the reaction preparation developed; after six days, the sol had not yet solidified.

The invention claimed is:

1. Oligomer or polymer comprising at least one structural unit which is selected from the group consisting of silicon cyanurates, [Si$_3$(C$_3$N$_3$O$_3$)$_4$]$_n$; silicon cyamelurates, [Si$_3$(C$_6$N$_7$O$_3$)$_4$]$_n$; silyl cyanurates, [Si(R$^a$R$^b$)$_{1.5}$(C$_3$N$_3$O$_3$)]$_n$; silyl cyamelurates, [Si(R$^a$R$^b$)$_{1.5}$(C$_6$N$_7$O$_3$)]$_n$; silsesquicyanurates, [Si(R$^a$)(C$_3$N$_3$O$_3$)]$_n$; and silsequicyamelurates, [Si(R$^a$)(C$_6$N$_7$O$_3$)]$_n$; wherein n represents a whole number between 1 and ∞, preferably 1 to 50,000, and R$^a$ and R$^b$ are independently selected from group α consisting of hydrogen, halogen, hydroxy, straight-chained or branched-chained (C$_1$-C$_{18}$)alkyl residue, (C$_3$-C$_7$) cycloalkyl residue, a straight-chained or branched-chained (C$_2$-C$_{18}$) alkenyl residue, a straight-chained or branched-chained (C$_2$-C$_{18}$) alkinyl residue, a straight-chained or branched-chained (C$_1$-C$_6$) alkoxy residue, furyl, furanyl, benzofuranyl, thienyl, thiazolyl, benzothiazolyl, thiadiazolyl, imidazolyl, pyrazolyl, triazolyl, tetrazolyl, pyrazinyl, pyrrolidinyl, pyrimidinyl, imidazolinyl, pyrazolidinyl, phenyl, phenoxy, benzyl, benzyloxy, naphthyl, naphthoxy and pyridyl, which can each be substituted with one to five substituents independently selected from group β consisting of a straight-chained or branched-chained (C$_1$-C$_6$) alkyl residue, a (C$_3$-C$_7$) cycloalkyl residue, a straight-chained or branched-chained (C$_1$-C$_6$) alkoxy residue, halogen, hydroxy, amino, di(C$_1$-C$_6$)alkylamino, nitro, cyano, benzyl, 4-methoxybenzyl, 4-nitrobenzyl, phenyl and 4-methoxyphenyl.

2. The oligomer or polymer according to claim 1, which is a silicon-centered dendritic compound of a first generation, or of a higher generation derived therefrom.

3. The oligomer or polymer according to claim 1, which is a cyanurate- or cyarnelurate-centered dendritic compound of a first generation or of a higher generation derived therefrom.

4. The oligomer or polymer according to claim 1, which is a derivatized silyl cyanurate, ([Si(R$^a$R$^b$)—R$^d$—Si(R$^e$R$^f$)]$_{1.5}$[C$_3$N$_3$O$_3$])$_n$, or a derivatized silyl cyamelurate, ([Si(R$^a$R$^b$)—R$^d$—Si(R$^e$R$^f$)]$_{1.5}$[C$_6$N$_7$O$_3$])$_n$, wherein n, R$^a$, R$^b$, R$^e$ and R$^f$ are defined, independently of each other, as R$^a$ and R$^b$ above, and wherein R$^d$ represents a SiR$^a$R$^b$ group, a chalcogen atom, particularly an oxygen atom, a (C$_1$-C$_6$) alkylene group, particularly methylene, a (C$_6$-C$_{10}$) arylene group, particularly phenylene, or an R$^9$X bridge wherein X represents an element of the third or fifth main group, and R$^9$ is selected from the group consisting of hydrogen, halogen, hydroxy, a straight-chained or branched-chained (C$_1$-C$_{18}$) alkyl residue, a (C$_3$-C$_7$) cycloalkyl residue, a straight-chained or branched-chained (C$_2$-C$_{18}$) alkenyl residue, a straight-chained or branched-chained (C$_2$-C$_{18}$) alkinyl residue, and a straight-chained or branched-chained (C$_1$-C$_6$) alkoxy residue.

5. The oligomer or polymer according to any one of claims 1-4 in the form of a colloidal suspension.

6. A method for the manufacture of the oligomers or polymers according to any one of claims 1-4, which comprises the step of reacting cyanuric acid, cyameluric acid or both with tetraalkylorthosilicate or with a corresponding alkyl alkoxysilane with one or two substitutions.

7. A method for the manufacture of oligomers or polymers according to one of claims 1-4, which comprises the step of reacting a tris(trialkylsilyl)cyanurate, tris(trialkylsilyl)

cyamelurate or both with silicon tetrachloride or with a corresponding chlorosilane with one, two or three substitutions.

8. An article of manufacture comprising the oligomer or polymer according to any one of claims 1-4.

9. The article of manufacture according to claim 8, wherein the article is a chromatography stationary phase, a microporous filter, a liquid and gas storage medium. a catalyst, a catalyst carrier, a flame proofing agent or a polymer foam.

* * * * *